United States Patent
Neveu et al.

(10) Patent No.: US 10,865,114 B2
(45) Date of Patent: Dec. 15, 2020

(54) PROCESS FOR PREPARING PRECIPITATED SILICA COMPRISING A HIGH COMPACTION STEP

(71) Applicant: RHODIA OPERATIONS, Paris (FR)

(72) Inventors: Sylvaine Neveu, Paris (FR); Anne-Laure Pinault, Antony (FR)

(73) Assignee: RHODIA OPERATIONS, Aubervilliers (FR)

( * ) Notice: Subject to any disclaimer, the term of this patent is extended or adjusted under 35 U.S.C. 154(b) by 406 days.

(21) Appl. No.: 14/386,015

(22) PCT Filed: Mar. 21, 2013

(86) PCT No.: PCT/EP2013/055971
§ 371 (c)(1),
(2) Date: Sep. 18, 2014

(87) PCT Pub. No.: WO2013/139930
PCT Pub. Date: Sep. 26, 2013

(65) Prior Publication Data
US 2015/0056120 A1 Feb. 26, 2015

(30) Foreign Application Priority Data
Mar. 22, 2012 (FR) ...................... 12 52586

(51) Int. Cl.
*C01B 33/12* (2006.01)
*C01B 33/193* (2006.01)

(52) U.S. Cl.
CPC .......... *C01B 33/124* (2013.01); *C01B 33/193* (2013.01)

(58) Field of Classification Search
CPC ..... C01B 33/12; C01B 33/124; C01B 33/193; C01B 33/18; C01B 33/187; C01B 33/128
See application file for complete search history.

(56) References Cited

U.S. PATENT DOCUMENTS

| 4,179,431 A * | 12/1979 | Kilian | C01B 33/193 524/492 |
| 4,359,342 A * | 11/1982 | Stacy | C08K 9/04 106/490 |
| 5,403,570 A | 4/1995 | Chevallier et al. | |
| 5,882,617 A | 3/1999 | Chevallier et al. | |
| 6,191,205 B1 | 2/2001 | Micouin et al. | |
| 6,335,396 B1 | 1/2002 | Chevallier et al. | |
| 6,468,493 B1 * | 10/2002 | Chevallier | B82Y 30/00 423/339 |
| 2005/0032965 A1 | 2/2005 | Valero | |
| 2011/0178227 A1 | 7/2011 | Allain et al. | |
| 2013/0171051 A1 | 7/2013 | Clouin et al. | |

FOREIGN PATENT DOCUMENTS

| DE | 527521 C | 6/1931 | |
| EP | 0520862 A1 | 12/1992 | |
| EP | 0881252 A1 | 12/1998 | |
| EP | 0966207 B1 | 7/2004 | |
| EP | 1764344 A2 * | 3/2007 | B60C 1/00 |
| JP | 57-056314 A | 4/1982 | |
| JP | 60-108315 A | 6/1985 | |
| WO | WO 95/09127 A1 | 4/1995 | |
| WO | WO 95/09128 A1 | 4/1995 | |
| WO | WO 98/54090 A1 | 12/1998 | |
| WO | WO 03/016215 A1 | 2/2003 | |
| WO | WO 2009/112458 A1 | 9/2009 | |
| WO | WO 2012/010712 A1 | 1/2012 | |
| WO | WO 2013/139932 A1 | 9/2013 | |
| WO | WO 2013/139933 A1 | 9/2013 | |
| WO | WO2013139934 A1 | 9/2013 | |

OTHER PUBLICATIONS

U.S. Appl. No. 14/386,012, Neveu et al.
U.S. Appl. No. 14/386,093, Neveu et al.
U.S. Appl. No. 14/386,069, Fournier et al.

* cited by examiner

Primary Examiner — Smita S Patel

(57) ABSTRACT

A process for preparing precipitated silica comprising a reaction of a silicate with an acidifying agent to obtain a suspension of precipitated silica, followed by a step of separation to obtain a cake and a step of drying said cake, wherein a step of compaction of said cake at a pressure greater than 10 bars is carried out between the step of separation and the step of drying.

11 Claims, No Drawings

PROCESS FOR PREPARING PRECIPITATED SILICA COMPRISING A HIGH COMPACTION STEP

The present application is a U.S. national stage entry under 35 U.S.C. § 371 of International Application No. PCT/EP2013/055971 filed Mar. 21, 2013, which claims priority to French Application No. 12.52586 filed on Mar. 22, 2012, the whole content of this application being herein incorporated by reference for all purposes.

The present invention relates to an improved process for preparing precipitated silica.

It is known to use precipitated silica as a catalyst carrier, active material absorbent (in particular liquid carrier, for example, used in food, such as vitamins (in particular vitamin E), choline chloride), viscosity, texturizing or anti-caking agent, element for battery separators, toothpaste or paper additive.

Precipitated silica may also be used as a reinforcing filler in silicone matrices (for example, for coating electrical cables) or in compositions based on natural or synthetic polymer(s), in particular on elastomer(s), particularly diene elastomers, for example for shoe soles, floor coverings, gas barriers, flame retardant materials, as well as technical parts, such as cableway rollers, electric household appliance seals, liquid or gas pipe seals, braking system seals, sheaths, cables and transmission belts.

Precipitated silica has in particular been used for some time as a reinforcing white filler in elastomers, and in particular in tires.

Precipitated silica is generally prepared by a precipitation reaction between a silicate, in particular an alkali metal silicate, and an acidifying agent, followed by a separating step by means of filtration to obtain a filter cake and typically a step for washing said cake, then optionally a step for disintegrating said filter cake and a drying step, for example by atomization, for said cake.

In the processes of the state of the art, the energy consumption is high. Drying is the main source of energy consumption and thus represents a relatively high cost.

There is therefore a need to reduce energy consumption, and therefore for example in the context of the drying operation.

Thus, one of the objectives of the present invention is to provide a process for preparing a precipitated silica making it possible to limit energy costs, in particular in terms of drying.

One of the objectives of the present invention consists in providing a process for preparing a precipitated silica that can make it possible to limit the drying times.

One of the objectives of the invention is in particular to provide an alternative to the known processes for preparing a precipitated silica that is cost-effective and easy to carry out.

One of the objectives of the present invention preferably consists in providing a process making it possible to decrease energy consumption during drying, in particular relative to the processes of the state of the art, and generally by at least approximately 15%, in particular by at least approximately 20%, for example by at least approximately 25%.

One of the objectives of the present invention preferably consists in providing a process making it possible to increase the productivity of the process for preparing precipitated silica, in particular during the drying step, in particular relative to the processes of the state of the art, generally by at least approximately 20%, in particular by at least approximately 25%, for example by at least approximately 30%.

The present invention therefore relates to a process for preparing precipitated silica comprising reacting a silicate with an acidifying agent to obtain a precipitated silica suspension, followed by a separating step to obtain a cake and a step for drying said cake, and in which a step for compacting said cake at a pressure greater than 10 bars is carried out between the separating step and the drying step.

In particular, the process according to the present invention therefore comprises the following steps:

at least one silicate is reacted (precipitation reaction) with at least one acidifying agent so as to obtain a precipitated silica suspension, a solid-liquid separating step, more particularly a filtration step, is performed to obtain a solid product, also called "filter cake,"

said filter cake undergoes a compacting step at a pressure greater than 10 bars, and the compacted cake thus obtained is dried.

The specific step of the inventive process, combined with the other steps of said process, consists of a compacting step at a high pressure, making it possible to eliminate a significant quantity of water from the cake obtained at the end of the precipitation and separating steps.

Such a high-pressure compacting operation, combined with the other steps of the process, then makes it possible to increase the dry matter content of the product before the drying step. The product, which then undergoes drying, contains less water, which saves energy for the subsequent drying step.

Implementing the process according to the invention makes it possible, in particular during the drying step, to reduce the energy consumption, and to increase productivity, in general, by at least approximately 20%, preferably by at least approximately 25%, for example by at least approximately 30%, in particular by at least approximately 35%, with respect to the processes of the state of the art, advantageously while not deteriorating the properties of the precipitated silica obtained, in particular its dispersibility, particularly in elastomers.

The step for compacting the filter cake in particular makes it possible to remove water. The more the filter cake is compacted, the more water is removed and the more the dry matter content of said cake is therefore increased.

It may be carried out using techniques known by those skilled in the art. It is advantageously done on a filter equipped with compacting means, the compacting pressure being relatively high. It may be done at the end of filtration, after or toward the end of an optional washing step, for example, on a filter press by inflating membranes of the membranous plates.

In the process according to the invention, the compacting step is carried out at a pressure greater than 10 bars, preferably at a pressure of at least 20 bars.

According to one embodiment of the inventive process, the compacting step is done at a pressure greater than 10 bars and less than 60 bars, preferably comprised between 15 and 45 bars, in particular between 20 and 45 bars, in particular between 20 and 35 bars.

Advantageously, this step is done at a compacting pressure comprised between 20 and 30 bars. For example, the pressure may be approximately 25 bars.

In the context of the inventive process, it is generally preferable to perform this compacting step at a pressure of no more than 45 bars, in particular no more than 35 bars. In fact, at excessively high pressures, the filter cake may be deteriorated and therefore not lead to precipitated silica particles of satisfactory quality.

The compacting step may optionally be carried out on the same filter as that used during the filtration step. The filtration step, the optional washing step and the compacting step may, in some cases, consist of a single separating step comprising filtration, optional washing (for example, using water), and strong final compacting on a filter equipped with compacting means, such as a filter press.

In general, the length of the compacting step at the indicated pressure is at least 200 seconds, preferably comprised between 300 and 600 seconds.

Preferably, the product obtained at the end of the compacting step has a dry matter level (or dryness or solid content level) of at least 25 wt %, in particular comprised between 25 and 40 wt %, for example between 25 and 35 wt %.

Advantageously, the product obtained at the end of the compacting step has a dry matter level of at least 28 wt %, in particular comprised between 28 and 35 wt %, for example between 28 and 32 wt %. This dry matter level may be at least 29 wt %, in particular at least 30 wt %, and in particular comprised between 29 and 35 wt %, for example between 29 and 32 wt %.

The process according to the invention relates to a synthesis process for precipitated silica, i.e., a precipitation step is first carried out in which at least one acidifying agent is reacted with at least one silicate, without being limited to a particular type of precipitated silica.

The process according to the invention may in particular be carried out to prepare precipitated silica as obtained according to the processes for example described in applications EP 0 520 862, EP 0 670 813, EP 0 670 814, EP 0 917 519, WO 95/09127, WO 95/09128, WO 98/54090, WO 03/016215, WO 2009/112458 and WO 2012/010712.

The precipitation reaction by reacting a silicate with an acidifying agent may be done in the process according to the present invention using any preparation method, in particular by adding an acidifying agent on a silicate starter, or by simultaneous, total or partial, addition of acidifying agent and silicate on a water starter, or silicate or acidifying agent.

The choice of the acidifying agent and the silicate is made in a manner well known in itself. The acidifying agent used is generally a strong mineral acid such as sulfuric acid, nitric acid or hydrochloric acid, or an organic acid such as acetic acid, formic acid, or carbonic acid.

At the end of the precipitation step, a suspension (or slurry) of precipitated silica is obtained, to which various additives may optionally be added, which is then separated.

According to one particular embodiment of the invention, the aforementioned separating step consists of a solid-liquid separating step. Preferably, it consists of a filtration step, at the end of which a filter cake is obtained, if applicable followed by a step for washing said cake.

The filtration may be done using any suitable method, for example using a filter press or a belt filter or a vacuum rotary filter.

The cake obtained then undergoes the compacting step described above. It is advantageously done by washing on a filter equipped with compacting means, at the aforementioned pressure. It may be done at the end of filtration, after or toward the end of the optional washing step, for example on a filter press by inflating membranes of the membranous plates.

In the context of the inventive process, the cake obtained at the end of the compacting step then undergoes a drying step.

Any drying means well known by those skilled in the art may be used to dry the solids.

Preferably, the drying technique used during the drying step of the inventive process is not an atomization process. It is for example possible to use a dryer of the ring dryer type. The drying may be done using heated steam, in particular in a fluidized bed or a ring dryer.

According to one very preferred embodiment, the inventive process does not comprise a disintegrating step, in particular between the compacting step (or the optional lump breaking step as indicated below) and the drying step. This embodiment thus comprises direct drying of the cake, without going through an intermediate disintegrating step, and, in general, the drying step of the corresponding process according to the invention is then not done by atomization.

According to one non-preferred embodiment, the inventive process may comprise a step of disintegrating the cake obtained at the end of the compacting step (or the optional lump breaking step as indicated below). The disintegrating step is a fluidification or liquefaction operation, in which the cake is rendered liquid, the precipitated silica being again in suspension. In general, this operation in particular makes it possible to lower the viscosity of the suspension to be dried subsequently. This operation may thus be done by subjecting the cake to a chemical action, for example, by adding an aluminum compound such as sodium aluminate, and/or acid, preferably coupled with a mechanical action (for example, by passing through a tub that is continuously agitated or in a colloid-type mill). The drying step is then generally done by atomization. To that end, any suitable type of atomizer can be used, in particular a turbine atomizer, preferably a nozzle atomizer, a liquid pressure atomizer or a two-fluid atomizer. More particularly, the precipitated silica that may then be obtained assumes the form of substantially spherical beads (micropearls), preferably with an average size of at least 80 μm.

According to one alternative embodiment, the inventive process may comprise a lump breaking step between the compacting step and the drying step (or the optional disintegrating step).

This optional step consists of pulverizing the cake resulting from the compacting step and makes it possible to decrease the particle size of said cake. For example, this step may be carried out with a Gericke "Nibleur" tool, in which the cake is forced through a grate with a diameter smaller than 20 mm, preferably with a size comprised between 2 and 14 mm. This lump breaking step may also be done using Wyssmont tools, such as the "Rotocage Lumpbreaker," the "double Rotocage Lumpbreaker" or the "Triskelion Lumpbreaker."

Preferably, in particular when the process according to the invention does not comprise a disintegrating step or an atomization drying step, the precipitated silica obtained at the end of the drying step assumes the form of granules (for example, substantially cylindrical) or powder.

In all cases, at the end of the drying step, it is optionally possible to perform a grinding step on the recovered product.

Likewise, the dried product, in particular when it assumes the form of a powder, or ground product may optionally undergo an agglomerating step, which, for example, consists of a direct compression, a wet granulation (i.e., using a binder such as water, silica suspension, etc.), an extrusion, or preferably, dry compacting. When the latter technique is used, it may be timely to deaerate (operation also called pre-densification or degassing) the powdery product so as to eliminate the air included therein and to ensure more uniform compacting. The precipitated silica that may be obtained at the end of this agglomerating step is generally in the form of granules.

In general, when the precipitated silica obtained using the inventive process assumes the form of granules, in particular at the end of the drying step, said granules have a size of at least 1 mm, in particular comprised between 1 and 10 mm, for example between 1 and 8 mm, in particular along their largest axis, and preferably a level of particles smaller than 75 µm of less than 5 wt %.

When the precipitated silica obtained using the inventive process assumes the form of a powder, said powder generally has an average size comprised between 5 and 60 µm.

The following examples illustrate the invention, without, however, limiting the scope thereof.

EXAMPLES

Example 1 (Reference)

The precipitated silica suspension used (S) is a Z1165MP silica slurry, resulting from a precipitation reaction, having the following characteristics:
Temperature: 60° C.
pH: 4.4-5.2
Humidity: 90%

The silica suspension S is filtered and washed on a filter press, then undergoes compacting at a pressure of 8 bars on the same filter. The resulting silica cake has a solids content of 23.5 wt %.

The silica cake is then lump broken by passing through a Nibleur tool (Gericke) equipped with an 8 mm grate.

The lump-broken silica cake is then fed into a ring dryer (GEA Barr Rosin) by a conveyor belt at 8 kg/h. The input temperature of the dryer is set at 305° C. and the output temperature at 130° C.

The output product is a precipitated silica in powder form with a humidity equal to 6.4%.

The obtained precipitated silica has a pore distribution such that its pore volume ratio V2/V1 (pore volume consisting of the pores with diameters comprised between 175 and 275 Å/pore volume consisting of the pores with diameters smaller than or equal to 400 Å, the pore volumes being measured by mercury porosimetry, the pore diameters being calculated by the Washburn relationship with a contact angle theta equal to 130° and a surface tension gamma equal to 484 dynes/cm or N/m (Micromeritics Autopore IV 9500 porosimeter)) is 54%.

Example 2 (According to the Invention)

The precipitated silica suspension S is filtered and washed in the same way as in example 1.

At the end of washing, compacting at a pressure of 25 bars by inflating membranes of the membranous plates of the filter press is applied to the cake. The silica cake obtained has a solids content of 30 wt %.

The silica cake is then lump-broken by passing through a Nibleur tool (Gericke) equipped with an 8 mm grate.

The lump-broken silica cake is then fed into a ring dryer (GEA Barr Rosin) by a conveyor belt at 9 kg/h. The input temperature of the dryer is set at 300° C. and the output temperature at 131° C.

The output product is a precipitated silica in powder form with a humidity equal to 7.1%.

An energy gain of 29% can be seen, as well as an associated productivity gain of 39% relative to example 1.

In addition to having a pore volume ratio V2/V1 (56%) close to that of the precipitated silica obtained in example 1, the precipitated silica also has a similar dispersibility to the latter.

The process according to the invention here comprising a compacting step at a pressure of 25 bars makes it possible to save energy and increase productivity during drying.

The invention claimed is:

1. A process for preparing precipitated silica, the process comprising;
    reacting a silicate with an acidifying agent to obtain a precipitated silica suspension,
    separating a precipitated silica from the suspension by a single separating step to obtain a cake, wherein the separating step consists of filtration, optional washing, and compacting on a filter press, and
    drying the said cake,
    wherein compacting said cake is carried out at a pressure between 10 and 45 bars and
    wherein, after compacting and before drying, said cake has a dry matter level between 29 and 35 wt %.

2. The process according to claim 1, wherein compacting said cake is carried out at a pressure between 15 and 45 bars.

3. The process according to claim 1, wherein compacting said cake is carried out at a pressure of at least 20 bars.

4. The process according to claim 1, not comprising a disintegrating step.

5. The process according to claim 1, wherein the drying step is not carried out by atomization.

6. The process according to claim 1, further comprising a lump breaking step which is carried out between the compacting step and the drying step.

7. The process according to claim 1, wherein the dried cake is subjected to a grinding step.

8. The process according to claim 1, wherein the dried cake is subjected to an agglomerating step.

9. The process according to claim 1, wherein compacting said cake is carried out at a pressure between 20 and 35 bars.

10. The process according to claim 1, wherein, after compacting and before drying, said cake has a dry matter level between 29 and 32 wt %.

11. The process according to claim 7, wherein the dried cake that has been subject to the grinding step is subjected to an agglomerating step.

* * * * *